(12) United States Patent
Koiwa et al.

(10) Patent No.: US 11,398,635 B2
(45) Date of Patent: Jul. 26, 2022

(54) METHOD OF OPERATING FUEL CELL SYSTEM

(71) Applicant: HONDA MOTOR CO., LTD., Tokyo (JP)

(72) Inventors: Nobuki Koiwa, Wako (JP); Hideo Numata, Wako (JP); Jumpei Ogawa, Wako (JP); Yusai Yoshimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/217,337

(22) Filed: Mar. 30, 2021

(65) Prior Publication Data
US 2021/0305599 A1   Sep. 30, 2021

(30) Foreign Application Priority Data
Mar. 31, 2020   (JP) .............................. JP2020-062583

(51) Int. Cl.
H01M 8/04119 (2016.01)
H01M 8/04223 (2016.01)
H01M 8/04746 (2016.01)

(52) U.S. Cl.
CPC ... *H01M 8/04179* (2013.01); *H01M 8/04164* (2013.01); *H01M 8/04253* (2013.01); *H01M 8/04753* (2013.01); *H01M 2250/20* (2013.01)

(58) Field of Classification Search
CPC ......... H01M 8/04179; H01M 8/04164; H01M 8/04253; H01M 8/04753; H01M 2250/20; H01M 8/04201; H01M 8/04231; H01M 8/04291; H01M 8/04373; H01M 8/04761
See application file for complete search history.

(56) References Cited

U.S. PATENT DOCUMENTS

| | | | | |
|---|---|---|---|---|
| 8,241,804 B1* | 8/2012 | Matsumoto | ......... | H01M 8/0432 |
| | | | | 429/444 |
| 2010/0255394 A1* | 10/2010 | Wake | ................ | H01M 8/04231 |
| | | | | 429/429 |
| 2013/0034787 A1* | 2/2013 | Miyata | .............. | H01M 8/04798 |
| | | | | 429/429 |
| 2016/0133963 A1* | 5/2016 | Naganuma | ........ | H01M 8/04253 |
| | | | | 429/414 |

FOREIGN PATENT DOCUMENTS

| | | |
|---|---|---|
| JP | 2005-317264 A | 11/2005 |
| JP | 2006-269221 A | 10/2006 |
| JP | 2008-218242 A | 9/2008 |
| JP | 2009-076261 A | 4/2009 |
| JP | 5002921 B2 | 8/2012 |
| JP | 2016-028372 A | 2/2016 |

* cited by examiner

*Primary Examiner* — Stewart A Fraser
(74) *Attorney, Agent, or Firm* — Carrier Blackman & Associates, P.C.; Joseph P. Carrier

(57) ABSTRACT

A fuel cell system includes a fuel cell stack, a fuel gas supply channel, a circulation passage, a purge valve, and a temperature sensor. A method of operating the fuel cell system performs a judging step of determining whether or not the temperature detected by the temperature sensor is at or below a given temperature. Then, if the temperature is at or below the given temperature, the method performs a purge valve scavenging process step of intermittently opening and closing the purge valve multiple times, while supplying the fuel gas through the fuel gas supply channel.

9 Claims, 4 Drawing Sheets

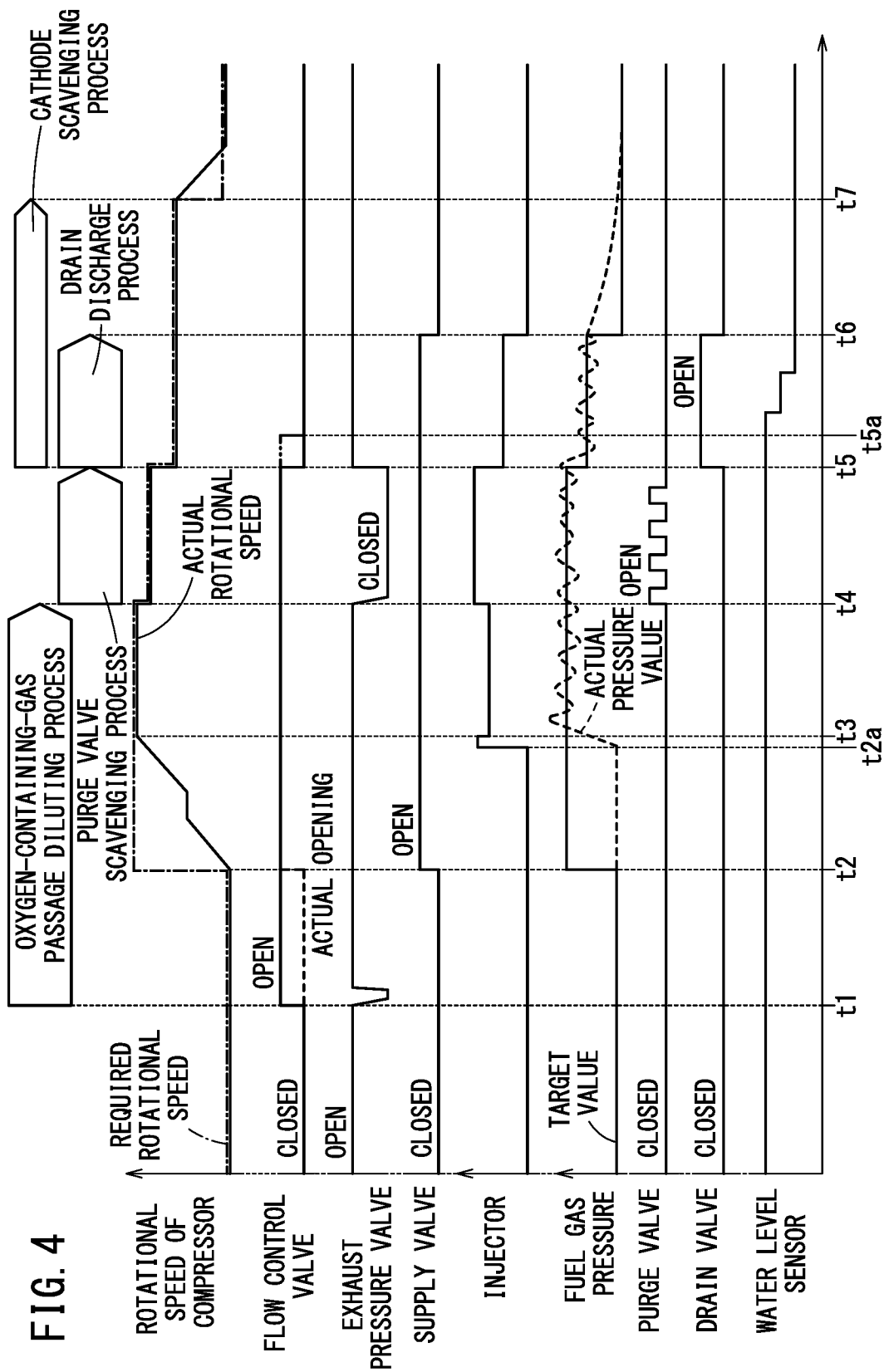

METHOD OF OPERATING FUEL CELL SYSTEM

CROSS-REFERENCE TO RELATED APPLICATION

This application is based upon and claims the benefit of priority from Japanese Patent Application No. 2020-062583 filed on Mar. 31, 2020, the contents of which are incorporated herein by reference.

BACKGROUND OF THE INVENTION

Field of the Invention

The present invention relates to a method of operating a fuel cell system including a purge valve for discharging fuel gas from a circulation passage formed on channels for supplying the fuel gas into a fuel cell stack.

Description of the Related Art

A fuel cell system includes a fuel cell stack, fuel-gas-related devices for supplying fuel gas (anode gas), such as hydrogen gas, into the fuel cell stack, and oxygen-containing-gas-related devices for supplying oxygen-containing gas (cathode gas), such as air, into the fuel cell stack. The fuel cell stack generates electricity through electrochemical reactions between the fuel gas and the oxygen-containing gas.

As disclosed in Japanese Laid-Open Patent Publication No. 2008-218242, the fuel-gas-related devices include a circulation passage for circulating fuel off-gas (fuel gas) discharged from the fuel cell stack back into a fuel supply channel for supplying the fuel gas into the fuel cell stack, a purge channel for discharging the fuel gas from the circulation passage, and a purge valve for opening and closing the purge channel. For example, the purge valve closes the purge channel in normal state, and it is opened to discharge the fluid in the circulation passage according to the condition, for example when the concentration of nitrogen gas has increased in the circulation passage.

SUMMARY OF THE INVENTION

By the way, the fluid flowing through the circulation passage of the fuel cell system (the fuel off-gas discharged from the fuel cell stack) contains water vapor that was formed in the power generation of the fuel cell stack. The water vapor will freeze if the temperature in the surrounding environment around the fuel cell system becomes low (e.g., below the freezing point), and then the orifice of the purge valve may be closed or its valve body may become stuck, for example. The purge valve may then become unable to open and close.

The present invention has been devised taking such a circumstance into consideration, and an object of the present invention is to provide a fuel cell system operating method that can prevent the freezing of the purge valve by effectively discharging water sticking to the orifice or its vicinity of the purge valve when the temperature in the surrounding environment becomes low.

In order to achieve the object above, an aspect of the present invention is directed to a method of operating a fuel cell system including a fuel cell stack, a fuel gas supply channel configured to supply a fuel gas into the fuel cell stack, a circulation passage configured to circulate a fuel off-gas discharged from the fuel cell stack back into the fuel cell stack, a purge valve configured to discharge the fuel off-gas from the circulation passage, and a temperature sensor configured to detect a temperature in a surrounding environment around the purge valve. The method includes a judging step of determining whether or not the temperature detected by the temperature sensor is at or below a given temperature; and a purge valve scavenging process step of, if the temperature is at or below the given temperature, intermittently opening and closing the purge valve multiple times, while supplying the fuel gas through the fuel gas supply channel.

This method of operating the fuel cell system can effectively discharge the water in the vicinity of the purge valve in a low-temperature environment where the purge valve may freeze. In particular, by intermittently opening and closing the purge valve multiple times to pulsate the fuel gas pressure upstream of the purge valve, the water contained in the circulation passage can be moved and discharged smoothly from the purge valve. The fuel cell system can thus prevent the freezing of the purge valve more reliably.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a time chart illustrating an example of operations performed in the freezing preventing process of the fuel cell system.

DESCRIPTION OF THE PREFERRED EMBODIMENTS

The present invention will be described in detail in connection with preferred embodiments while referring to the accompanying drawings.

Figure 1:
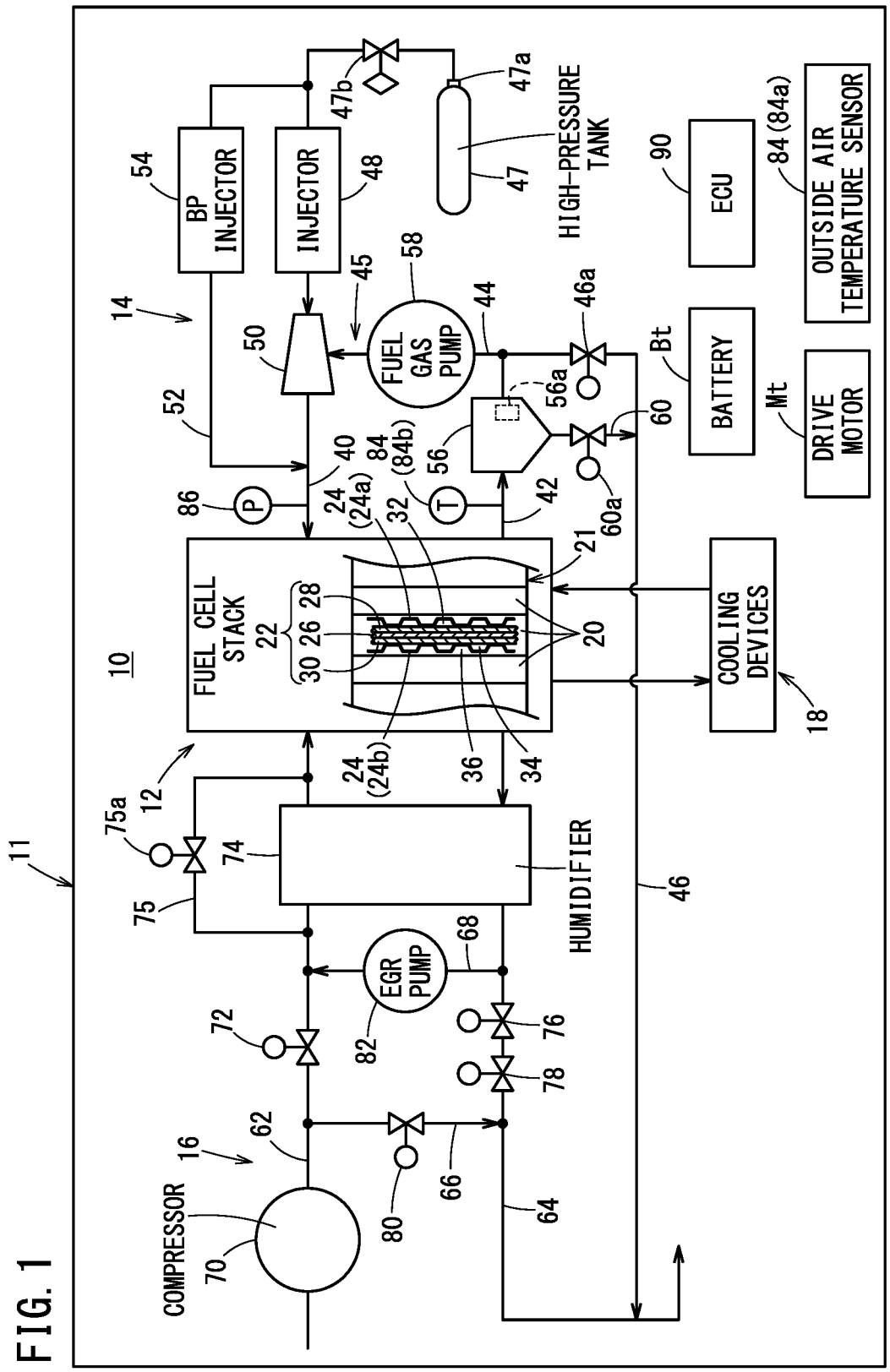
FIG. 1 is an explanatory diagram schematically illustrating an overall configuration of a fuel cell system according to an embodiment of the invention.

As shown in FIG. 1, a fuel cell system 10 according to an embodiment of the present invention includes a fuel cell stack 12, fuel-gas-related devices 14, oxygen-containing-gas-related devices 16, and cooling devices 18. The fuel cell system 10 is installed, for example, in a motor room of a fuel cell automobile (which will hereinafter be simply referred to as vehicle 11). The fuel cell system 10 supplies the electric power generated by the fuel cell stack 12 to a battery Bt of the vehicle 11, its drive motor Mt, and so on. The fuel cell system 10 is not limited to applications in which it is mounted in the vehicle 11, and may be used in stationary systems, for example.

The fuel cell stack 12 includes a plurality of power generation cells 20 that generate electricity through electrochemical reactions between a fuel gas (a hydrogen gas, anode gas) and an oxygen-containing gas (oxygen contained in air, cathode gas). The plurality of power generation cells 20 form a stack 21 that is stacked along the vehicle width direction in such a manner that their respective electrode planes are in a standing position when the fuel cell stack 12 is mounted in the vehicle 11. The plurality of power generation cells 20 may be stacked along the length direction of the vehicle 11 (front-rear direction) or the gravity direction.

Each power generation cell 20 includes a membrane electrode assembly 22 (hereinafter referred to as "MEA 22") and a pair of separators 24 (a first separator 24a and a second separator 24b) that sandwich the MEA 22 therebetween. The MEA 22 includes an electrolyte membrane 26 (e.g. solid polymer electrolyte membrane (cation exchange membrane)), an anode 28 provided at one surface of the electrolyte membrane 26, and a cathode 30 provided at the other surface of the electrolyte membrane 26. The first separator 24a and the MEA 22 form a fuel gas flow field 32 therebetween through which the fuel gas flows along the separator surface. The second separator 24b and the MEA 22 form an oxygen-containing gas flow field 34 therebetween through which the oxygen-containing gas flows along the separator surface. Further, as the plurality of power generation cells 20 are stacked, the first separator 24a and the second separator 24b form a coolant flow field 36 therebetween through which a coolant flows along the separators surfaces.

The fuel cell stack 12 further includes a plurality of passages (fuel gas passages, oxygen-containing gas passages, and coolant passages, which are not shown) for respectively conveying the fuel gas, the oxygen-containing gas, and the coolant along the stacking direction of the stack 21. The fuel gas passages communicate with the fuel gas flow field 32, the oxygen-containing gas passages communicate with the oxygen-containing gas flow field 34, and the coolant passages communicate with the coolant flow field 36.

The fuel cell stack 12 is supplied with the fuel gas through the fuel-gas-related devices 14. In the fuel cell stack 12, the fuel gas flows through the fuel gas passage (fuel gas inlet passage) into the fuel gas flow field 32 and is used to generate power at the anode 28. The fuel off-gas, which contains fuel gas not used in the power generation and water, flows out of the fuel gas flow field 32 into the fuel gas passage (fuel gas outlet passage) and is discharged out of the fuel cell stack 12 into the fuel-gas-related devices 14.

The fuel cell stack 12 is further supplied with the oxygen-containing gas through the oxygen-containing-gas-related devices 16. In the fuel cell stack 12, the oxygen-containing gas flows through the oxygen-containing gas passage (oxygen-containing gas inlet passage) into the oxygen-containing gas flow field 34, and is used to generate power at the cathode 30. The oxygen-containing off-gas, which contains oxygen-containing gas not used in the power generation and water, flows out of the oxygen-containing gas flow field 34 into the oxygen-containing gas passage (oxygen-containing gas outlet passage) and is discharged out of the fuel cell stack 12 into the oxygen-containing-gas-related devices 16.

The fuel cell stack 12 is further supplied with the coolant through the cooling devices 18. In the fuel cell stack 12, the coolant flows through the coolant passage (coolant inlet passage) into the coolant flow field 36 to appropriately adjust the temperature of the power generation cell 20. This coolant flows out of the coolant flow field 36 into the coolant passage (coolant outlet passage) and is discharged out of the fuel cell stack 12 into the cooling devices 18.

Next, the fuel-gas-related devices 14 for conveying the fuel gas outside the fuel cell stack 12 will be described in detail.

The fuel-gas-related devices 14 include a fuel gas supply channel 40 for supplying the fuel gas into the fuel cell stack 12, and a fuel gas discharge channel 42 for discharging the fuel off-gas from the fuel cell stack 12. A fuel gas circulation channel 44 is connected between the fuel gas supply channel 40 and the fuel gas discharge channel 42 so as to return the unreacted fuel gas contained in the fuel off-gas in the fuel gas discharge channel 42, back into the fuel gas supply channel 40.

That is, the downstream side of the fuel gas supply channel 40, the fuel gas discharge channel 42, and the fuel gas circulation channel 44 form a circulation passage 45 for circulating the fuel gas through the fuel cell stack 12. A purge channel 46 for discharging the fuel off-gas (fuel gas, water (including water vapor and sticking liquid water), nitrogen gas, etc.) from the circulation passage 45 is connected to the fuel gas circulation channel 44.

The upstream end of the fuel gas supply channel 40 is connected to a high-pressure tank 47. The high-pressure tank 47 is a supply source for storing and supplying the fuel gas, which sends the fuel gas into the fuel gas supply channel 40 based on the opening and closing of a supply valve 47a (in-tank electromagnetic valve) provided at the high-pressure tank 47 itself and a pressure reducing valve 47b provided on the way therefrom.

An injector 48 and an ejector 50 are connected in series in middle positions on the fuel gas supply channel 40, and a supply-side bypass channel 52 is connected to the fuel gas supply channel 40 to bypass the injector 48 and the ejector 50. A BP (bypass) injector 54 is provided on the supply-side bypass channel 52.

While the fuel cell system 10 is operating, the injector 48 and the BP injector 54 open and close on the upstream side (high-pressure side) of the fuel gas supply channel 40, to inject a given amount of fuel gas to the downstream side (low-pressure side). The injector 48 is the main injector that is used in power generation chiefly, and the BP injector 54 is a sub injector that supplies a large amount of hydrogen when, for example, the fuel cell stack 12 is started, or when high-current power generation is required. The ejector 50 supplies the fuel gas into the fuel cell stack 12 provided downstream, while drawing the fuel off-gas from the fuel gas circulation channel 44 by utilizing the negative pressure produced by the flow of the fuel gas injected from the injector 48.

A gas-liquid separator 56 is provided on the fuel gas discharge channel 42 so as to separate liquid (liquid water that is formed during power generation) and gas that are contained in the fuel off-gas. While the aforementioned fuel gas circulation channel 44 is connected to an upper part of the gas-liquid separator 56, one end of a drain channel 60 for discharging the liquid from the gas-liquid separator 56 is connected to the bottom of the gas-liquid separator 56. The drain channel 60 has a drain valve 60a provided thereon to open and close the channel inside. The gas-liquid separator 56 further has a water level sensor 56a for detecting the level of the liquid (liquid water) that has been separated from the fuel off-gas and accumulated at the bottom.

The fuel gas circulation channel 44 has a fuel gas pump 58 provided thereon for circulating the fuel off-gas into the fuel gas supply channel 40. One end of the purge channel 46 is connected to a position between the gas-liquid separator 56 and the fuel gas pump 58. The other end of the purge channel 46 is connected to an oxygen-containing gas discharge channel 64 of the oxygen-containing-gas-related devices 16 which will be described later. The other end of the drain channel 60 is connected to a middle position of the purge channel 46, and the purge channel 46 has a purge valve 46a for opening and closing the channel in a position upstream of the connection with the drain channel 60 (on the side of the fuel gas circulation channel 44). The purge valve 46a discharges the fuel off-gas (fuel gas) from the circulation passage 45. The purge valve 46a may be provided on the circulation passage 45 to discharge the fuel gas into the purge channel 46 that branches off from the circulation passage 45.

Next, the oxygen-containing-gas-related devices 16 for conveying the oxygen-containing gas outside the fuel cell stack 12 will be described in detail.

The oxygen-containing-gas-related devices 16 include an oxygen-containing gas supply channel 62 for supplying the oxygen-containing gas into the fuel cell stack 12, and an oxygen-containing gas discharge channel 64 for discharging the oxygen-containing off-gas from the fuel cell stack 12. Further, an oxygen-containing gas bypass channel 66 is connected between the oxygen-containing gas supply channel 62 and the oxygen-containing gas discharge channel 64 so as to convey the oxygen-containing gas in the oxygen-containing gas supply channel 62 directly into the oxygen-containing gas discharge channel 64. The fuel cell system 10 of this embodiment further includes an oxygen-containing gas circulation channel 68 connected between the oxygen-containing gas supply channel 62 and the oxygen-containing gas discharge channel 64, so as to circulate the oxygen-containing off-gas in the oxygen-containing gas discharge channel 64 into the oxygen-containing gas supply channel 62. The fuel cell system 10 need not necessarily have the oxygen-containing gas circulation channel 68.

A compressor 70 for compressing air taken in from the atmosphere and supplying it as the oxygen-containing gas is provided in a certain position on the oxygen-containing gas supply channel 62. The oxygen-containing gas bypass channel 66 is connected to the oxygen-containing gas supply channel 62 in a position downstream of the compressor 70 in the direction in which the oxygen-containing gas flows. A supply-side opening/closing valve 72 is provided on the oxygen-containing gas supply channel 62 in a position downstream of the connection with the oxygen-containing gas bypass channel 66 in the oxygen-containing gas flow direction. The oxygen-containing gas circulation channel 68 is connected to the oxygen-containing gas supply channel 62 in a position downstream of the supply-side opening/closing valve 72 in the oxygen-containing gas flow direction. Though not shown in the drawing, auxiliary machinery, such as an intercooler for cooling the oxygen-containing gas, may be provided on the oxygen-containing gas supply channel 62.

Further, a humidifier 74 is provided on the oxygen-containing gas supply channel 62 in a position between the fuel cell stack 12 and the compressor 70 (the downstream side of the supply-side opening/closing valve 72 in the oxygen-containing gas flow direction). The humidifier 74 is connected to both of the oxygen-containing gas supply channel 62 and the oxygen-containing gas discharge channel 64, so as to humidify the oxygen-containing gas in the oxygen-containing gas supply channel 62 with the water contained in the oxygen-containing off-gas in the oxygen-containing gas discharge channel 64. A humidifier bypass channel 75 that bypasses the humidifier 74 is provided on the oxygen-containing gas supply channel 62, and this humidifier bypass channel 75 has a humidifier bypass valve 75a provided thereon for opening and closing the channel.

The oxygen-containing gas circulation channel 68 is connected to the oxygen-containing gas discharge channel 64 in a position downstream of the humidifier 74 in the direction in which the oxygen-containing off-gas flows. An EGR pump 82 is provided on the oxygen-containing gas circulation channel 68 so as to circulate the oxygen-containing off-gas in the oxygen-containing gas discharge channel 64 back into the oxygen-containing gas supply channel 62.

Further, a discharge-side opening/closing valve 76 and an exhaust pressure valve 78 are provided on the oxygen-containing gas discharge channel 64 in positions downstream of the connection with the oxygen-containing gas circulation channel 68 in the flow direction of the oxygen-containing off-gas.

The oxygen-containing gas bypass channel 66 is connected to the oxygen-containing gas discharge channel 64 in a position downstream of the exhaust pressure valve 78 in the flow direction of the oxygen-containing off-gas. A flow control valve 80 is provided on the oxygen-containing gas bypass channel 66 so as to control the flow rate of the oxygen-containing gas flowing from the oxygen-containing gas supply channel 62 into the oxygen-containing gas discharge channel 64. Further, the purge channel 46 of the fuel-gas-related devices 14 is connected to the oxygen-containing gas discharge channel 64 in a position downstream of the connection with the oxygen-containing gas bypass channel 66.

The fuel cell system 10 further includes a temperature sensor 84 for detecting a temperature in the surrounding environment around the purge valve 46a. For example, the temperature sensor 84 may adopt an outside air temperature sensor 84a for detecting the temperature in the vicinity of the fuel cell system 10 (including the outside of the vehicle 11). Alternatively, the temperature sensor 84 may be attached to the purge valve 46a itself, or may adopt a fuel gas outlet temperature sensor 84b provided at the fuel gas discharge channel 42, for example.

The fuel cell system 10 further includes a pressure sensor 86 provided on the fuel gas supply channel 40, for detecting the pressure of the gas (fuel gas etc.) flowing in this fuel gas supply channel 40.

The fuel cell system 10 constructed as described above includes an ECU (Electronic Control Unit: control unit) 90 configured to control the operations of the components of the fuel cell system 10 to operate the fuel cell stack 12 to generate electric power. The ECU 90 is configured as a computer including a processor, memory, and input/output interface not shown. The ECU 90 may include a plurality of ECUs (e.g., a power generation ECU for controlling the current of the fuel cell stack 12, an ECU for the fuel-gas-related devices 14, an ECU for the oxygen-containing-gas-related devices 16, etc.).

Figure 2:
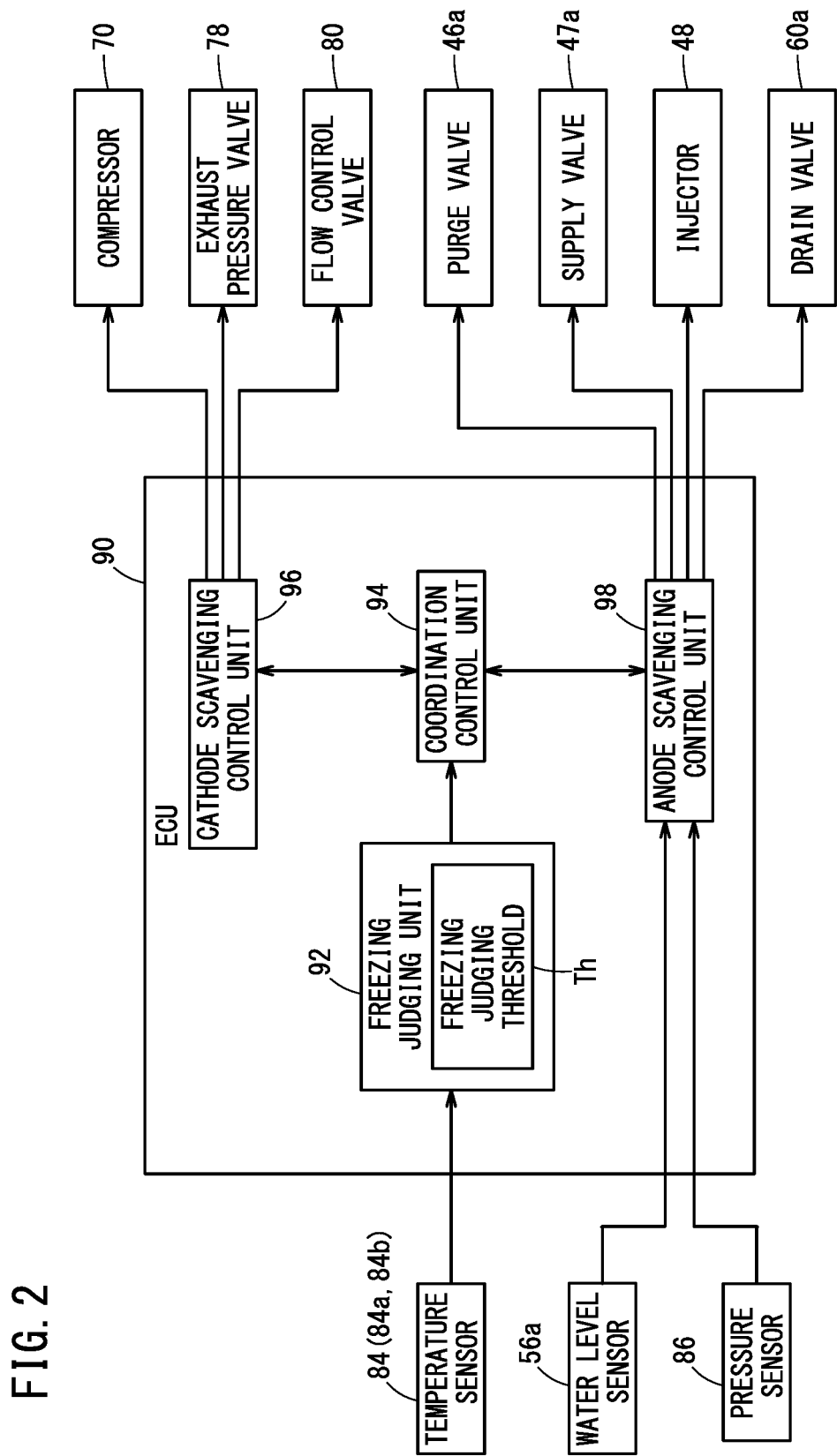
FIG. 2 is a block diagram illustrating functional units that are configured in an ECU in a freezing preventing process.

As shown in FIG. 2, the ECU 90 is connected to the auxiliary devices (or a power distribution unit for controlling the electric power supplied to the auxiliary devices) of the fuel cell system 10 through in-vehicle communication line or the like. Further, the aforementioned water level sensor 56a, temperature sensor 84, and pressure sensor 86 are connected to the ECU 90 through the in-vehicle communication line or the like.

The ECU 90 is operating with low power even in conditions where the operation of the vehicle 11 is stopped (ignition off), and judging or estimating whether the temperature in the surroundings of the fuel cell system 10 is low (e.g. below the freezing point) based on the temperature information detected by the temperature sensor 84. Then, if the ECU 90 determines that the temperature in the surroundings is low, the ECU 90 performs a purge valve scavenging process for preventing the freezing of the purge valve 46a.

That is, in the fuel cell system 10, if the fuel off-gas contains water vapor as mentioned above, the water vapor moves into the purge valve 46a on the purge channel 46. This water vapor freezes into ice in a low-temperature environment, for example, below the freezing point. Then, the frozen water may close the orifice of the purge valve 46a, or may make the valve body (not shown) of the purge valve 46a and its valve casing stuck together. Then, the purge valve 46a cannot discharge the fluid in the circulation passage 45.

To solve this problem, the fuel cell system 10 of this embodiment performs the purge valve scavenging process to avoid the freezing of the purge valve 46a, by discharging the water sticking to the purge valve 46a and the water vapor present in the circulation passage 45. The fuel cell system 10 is configured to perform the purge valve scavenging process together with a cathode scavenging process for preventing the freezing of the power generation cells 20 in the fuel cell stack 12 in low-temperature environments. A series of operations including the cathode scavenging process, the purge valve scavenging process, and other processes will hereinafter be referred to also as a freezing preventing process.

In order to perform the freezing preventing process, the ECU 90 configures functional blocks as shown in FIG. 2 by the processor reading and executing a program (not shown) stored in the memory. The ECU 90 configures therein a freezing judging unit 92, a coordination control unit 94, a cathode scavenging control unit 96, and an anode scavenging control unit 98. When the fuel cell system 10 has a plurality of ECUs, the anode scavenging control unit 98 may be provided in the ECU for the fuel-gas-related devices 14, with the cathode scavenging control unit 96 provided in the ECU for the oxygen-containing-gas-related devices 16.

The freezing judging unit 92 is a functional unit that is configured to determine or estimate the possibility of freezing of the purge valve 46a on the basis of the temperature information detected by the temperature sensor 84. The freezing judging unit 92 previously retains a freezing judging threshold Th (given temperature) that defines a low-temperature environment in which the purge valve 46a will freeze, and it determines whether or not the temperature information is equal to or lower than the freezing judging threshold Th. The temperature of the freezing judging threshold Th can be zero degrees, for example, but it may be set to a temperature lower than zero degrees by appropriately considering the structure of the purge valve 46a and the like. The freezing judging unit 92 may estimate that the temperature will become low in an early stage on the basis of, for example, the rate of decrease of the temperature information, before it becomes equal to or lower than the freezing judging threshold Th.

The coordination control unit 94 is a functional unit that is configured to coordinate control operations performed by the cathode scavenging control unit 96 and control operations performed by the anode scavenging control unit 98 in the freezing preventing process. That is, in the freezing preventing process, the operations of the auxiliary devices included in the fuel-gas-related devices 14 and the operations of the auxiliary devices included in the oxygen-containing-gas-related devices 16 are synchronized in an appropriate manner. The fuel cell system 10 can then take measures, for example, to dilute the fuel gas discharged from the purge channel 46 with the oxygen-containing gas discharged from the oxygen-containing gas discharge channel 64.

The freezing preventing process of the embodiment performs multiple processes sequentially or in parallel (an oxygen-containing-gas passage diluting process, a purge valve scavenging process, a cathode scavenging process, and a drain discharge process), and the coordination control unit 94 manages the timing for executing the individual processes. The oxygen-containing-gas passage diluting process is a process to supply the oxygen-containing gas into the passage of the oxygen-containing-gas-related devices 16 so that the concentration of the fuel gas that is discharged from the fuel-gas-related devices 14 later can be diluted with the oxygen-containing gas. The drain discharge process is a process to drain the liquid water accumulated in the gas-liquid separator 56 included in the fuel-gas-related devices 14.

In the freezing preventing process, the cathode scavenging control unit 96 controls individual auxiliary devices of the oxygen-containing-gas-related devices 16. The auxiliary devices among the oxygen-containing-gas-related devices 16 that are operated during the freezing preventing process include the compressor 70, the exhaust pressure valve 78, and the flow control valve 80. In the freezing preventing process, the supply-side opening/closing valve 72, the humidifier bypass valve 75a, and the discharge-side opening/closing valve 76 (all of which are shown in FIG. 1) are kept in an open state.

In the freezing preventing process, the anode scavenging control unit 98 controls individual auxiliary devices included in the fuel-gas-related devices 14. The auxiliary devices among the fuel-gas-related devices 14 that are operated in the freezing preventing process include the purge valve 46a, the supply valve 47a, the injector 48, and the drain valve 60a. In the freezing preventing process, the BP injector 54 (see FIG. 1) may be operated to increase the amount of injection of the fuel gas, which will not be explained in detail herein, though.

The fuel cell system 10 of the embodiment is configured basically as described above. Next, its operations will be described below.

While the vehicle 11 is operating (ignition on), the ECU 90 of the fuel cell system 10 controls the operations of the auxiliary devices of the fuel-gas-related devices 14 and the auxiliary devices of the oxygen-containing-gas-related devices 16 in order to operate the fuel cell stack 12 to generate electricity. The fuel cell stack 12 generates electricity through electrochemical reactions between the fuel gas and the oxygen-containing gas supplied through the operations of the auxiliary devices. Water is formed in the fuel cell stack 12 by the power generation, and the formed water is discharged out of the fuel cell stack 12 into the fuel gas discharge channel 42, the oxygen-containing gas discharge channel 64, and so on.

The liquid (liquid water) contained in the formed water discharged into the fuel gas discharge channel 42 is separated from the gas in the gas-liquid separator 56 and stored in the gas-liquid separator 56. On the other hand, the gas (water vapor) contained in the formed water discharged into the fuel gas discharge channel 42 circulates through the circulation passage 45 (fuel gas discharge channel 42, fuel gas circulation channel 44, fuel gas supply channel 40). This water vapor moves also into the purge channel 46 from the circulation passage 45, and is discharged through the purge channel 46 when the purge valve 46a, which is closed in normal state, is opened.

When the operation of the vehicle 11 is stopped (ignition off), the ECU 90 terminates the operations of the auxiliary devices in an appropriate manner and stops the power generation of the fuel cell stack 12. In the operation-stopped state, the aforementioned water vapor, or the liquid water formed by condensation of the water vapor, is present in the circulation passage 45, the purge channel 46, and the purge valve 46a, among the fuel-gas-related devices 14. Accordingly, the ECU 90 operates with low power to perform the process flow shown in FIG. 3A (a method of operating the fuel cell system 10).

The freezing judging unit 92 in the ECU 90 receives (acquires) the temperature information that the temperature sensor 84 outputs steadily (step S1). Then, the freezing judging unit 92 compares the temperature information with the previously retained, freezing judging threshold Th to determine whether or not the temperature information is equal to or lower than the freezing judging threshold Th (step S2). If the temperature information exceeds the freezing judging threshold Th (step S2: NO), there is no possibility that the purge valve 46a will freeze, and so the process moves to step S1 and repeats the same process flow.

On the other hand, if the temperature information is equal to or lower than the freezing judging threshold Th (step S2: YES), the purge valve 46a may freeze and so the process moves to step S3. In step S3, the coordination control unit 94 in the ECU 90 performs the freezing preventing process by coordinating the cathode scavenging control unit 96 and the anode scavenging control unit 98.

Figure 3B:
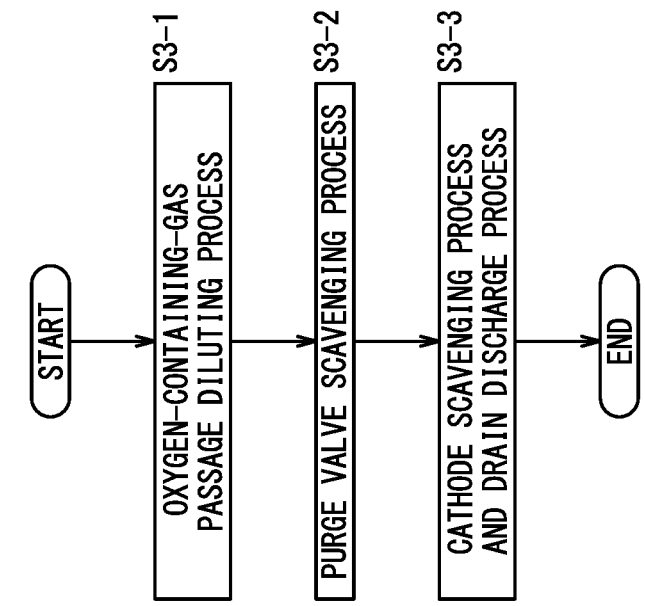
FIG. 3B is a flowchart showing an order of processes performed during the freezing preventing process.
Figure 3A:
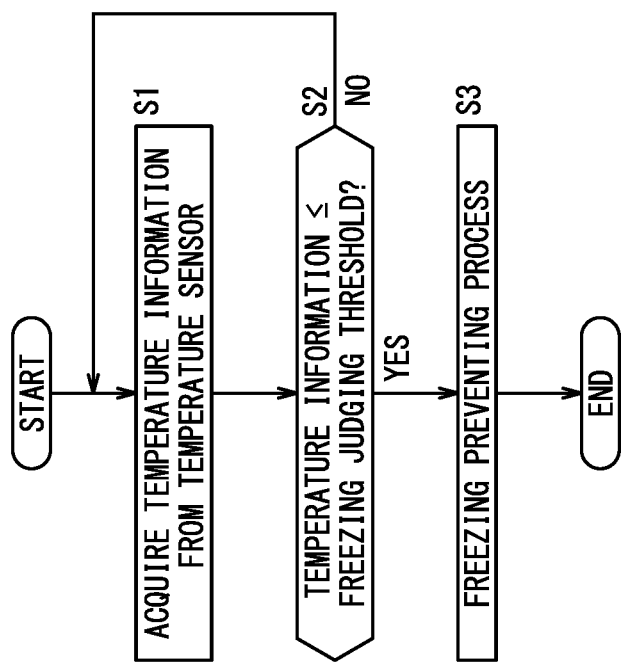
FIG. 3A is a flowchart illustrating a fuel cell system operating method.

In more detail, as shown in FIG. 3B, the coordination control unit 94 sequentially performs the oxygen-containing-gas passage diluting process (step S3-1), the purge valve scavenging process (step S3-2), and the cathode scavenging process and drain discharge process (step S3-3). Now, referring to the time chart of FIG. 4, the operations performed in the freezing preventing process (step S3-1 to step S3-3) will be described specifically.

At time t1 after the start of the freezing preventing process, the cathode scavenging control unit 96 in the ECU 90 outputs a valve-opening command to the flow control valve 80 that is closed in the operation-stopped state. The flow control valve 80 is then opened with 100% opening between time t1 and time t2 (see dotted line in FIG. 4), so that a large amount of oxygen-containing gas can flow into the oxygen-containing gas bypass channel 66. Further, at time t1, the cathode scavenging control unit 96 closes the exhaust pressure valve 78, which is open in the operation-stopped state, only for a short time, so as to check the condition of operation of the exhaust pressure valve 78. It opens the exhaust pressure valve 78 again after checking the operation of the exhaust pressure valve 78.

Then, at time t2 at which the flow control valve 80 actually opens, the cathode scavenging control unit 96 starts the rotation of the compressor 70 so as to supply the oxygen-containing gas into the oxygen-containing gas supply channel 62 downstream of the compressor 70. At this time t2, the cathode scavenging control unit 96 sets the required rotational speed of the compressor 70 to a first required rotational speed (e.g. 50000 rpm). On the basis of this first required rotational speed, the actual rotational speed of the compressor 70 gradually rises, and the actual rotational speed is controlled according to the first required rotational speed after time t3 at which it reaches the first required rotational speed.

Since the exhaust pressure valve 78 and the flow control valve 80 are opened, the oxygen-containing gas supplied into the oxygen-containing gas supply channel 62 by the rotation of the compressor 70 flows in the oxygen-containing gas supply channel 62 toward the fuel cell stack 12, and it also flows into the oxygen-containing gas bypass channel 66. The oxygen-containing gas thus fills the fuel cell stack 12 (oxygen-containing gas flow fields 34), the oxygen-containing gas discharge channel 64, and the oxygen-containing gas bypass channel 66.

Further, at time t2, the anode scavenging control unit 98 raises the target value of the fuel gas pressure in the circulation passage 45 to a given pressure value under the command of the coordination control unit 94, thus starting the operations of the fuel-gas-related devices 14. That is, the anode scavenging control unit 98 opens the supply valve 47a and the pressure reducing valve 47b provided on the upstream side (the side of the high-pressure tank 47) of the fuel gas supply channel 40, which have been closed in the operation-stopped state. Thus, the fuel-gas-related devices 14 supply the high-pressure fuel gas in the high-pressure tank 47 into the downstream side of the fuel gas supply channel 40, while lowering the pressure of the fuel gas at the pressure reducing valve 47b. However, since the injector 48 is not operating at time t2, the fuel gas is not injected to the downstream of the injector 48, and hence the fuel gas pressure in the circulation passage 45 (pressure sensor 86) does not rise.

Then, at time t2a that is somewhat before time t3, the anode scavenging control unit 98 starts the injector 48. The injector 48 injects the flow-controlled fuel gas into the downstream side of the fuel gas supply channel 40. Then, after time t3, the fuel gas fills the fuel cell stack 12 (fuel gas flow fields 32) and the circulation passage 45 (the fuel gas discharge channel 42, the fuel gas circulation channel 44, and the fuel gas supply channel 40 downstream of the ejector 50). Accordingly, the pressure sensor 86 detects the fuel gas pressure (actual pressure value) that is raised by the operation of the injector 48.

The coordination control unit 94 ends the oxygen-containing-gas passage diluting process (step S3-1 in FIG. 3B) at time t4 at which the passage of the oxygen-containing-gas-related devices 16 is filled with the oxygen-containing gas, and moves to the purge valve scavenging process after that (i.e. from time t4). In the purge valve scavenging process, the cathode scavenging control unit 96 sets the rotational speed of the compressor 70 to a second required rotational speed (e.g. 40000 rpm) that is lower than the first required rotational speed. The actual rotational speed of the compressor 70 lowers according to the second required rotational speed.

Further, with the flow control valve 80 being kept in the open state at time t4, the cathode scavenging control unit 96 closes the exhaust pressure valve 78 that was open before time t4. Since the exhaust pressure valve 78 is thus closed, the oxygen-containing gas does not flow to the fuel cell stack 12, and the oxygen-containing gas supplied from the compressor 70 all flows into the oxygen-containing gas bypass channel 66. Accordingly, a large amount of oxygen-containing gas flows into the oxygen-containing gas discharge channel 64 in the part downstream of the connection with the oxygen-containing gas bypass channel 66.

On the other hand, in the purge valve scavenging process after time t4, the anode scavenging control unit 98 opens and closes the purge valve 46a, which was closed in the operation-stopped state, intermittently (at intervals) multiple times. Further, at time t4, the anode scavenging control unit 98 increases the amount of the fuel gas injected from the injector 48. That is, the anode scavenging control unit 98 sets a second injection amount for the injector 48 from time t4 to time t5 that is larger than a first injection amount for the injector 48 from time t3 to time t4.

As a result, a large amount of fuel gas then flows into the purge channel 46 and the purge valve 46a from the circulation passage 45. By being opened and closed repeatedly at intervals, the purge valve 46*a* can pulsate the fuel gas pressure upstream of the purge valve 46*a* to move the water in the circulation passage 45 and the purge channel 46. For example, when the purge valve 46*a* is closed, the fuel gas pressure acting on the purge valve 46*a* increases. Then, when it is opened, it spatters the water inside (water vapor or liquid water) under this fuel gas pressure. This considerably reduces the water that is present in the vicinity of the valve body and at the orifice of the purge valve 46*a*. In particular, by continuously opening and closing the purge valve 46*a* multiple times, the anode scavenging control unit 98 can effectively discharge the water in the circulation passage 45 into the purge channel 46 downstream of the purge valve 46*a*.

When the purge valve 46*a* is thus opened, the gas that contains fuel gas is discharged together with the water into the purge channel 46 downstream of the purge valve 46*a*. The fuel gas discharged into the purge channel 46 mixes with the oxygen-containing gas in the oxygen-containing gas discharge channel 64 to which the purge channel 46 is connected. That is, the fuel gas can be diluted in the oxygen-containing gas discharge channel 64 because the oxygen-containing gas discharge channel 64 is filled with the oxygen-containing gas. The oxygen-containing gas discharge channel 64 then discharges the fuel gas diluted with the oxygen-containing gas, out of the vehicle 11.

The coordination control unit 94 performs this purge valve scavenging process in the period from time t4 to time t5. The period of execution of the purge valve scavenging process (the interval between time t4 and time t5) is not particularly limited, and it is set longer than the period of execution of the oxygen-containing-gas passage diluting process (from time t1 to time t4), for example.

At time t5, the coordination control unit 94 ends the purge valve scavenging process (step S3-2 in FIG. 3B), and it then performs the cathode scavenging process and the drain discharge process after that (i.e. from time t5). In the cathode scavenging process, the cathode scavenging control unit 96 sets the rotational speed of the compressor 70 to a third required rotational speed (e.g. 24000 rpm) that is lower than the second required rotational speed. The actual rotational speed of the compressor 70 lowers according to this third required rotational speed.

Also, at time t5, the cathode scavenging control unit 96 closes the flow control valve 80 and opens the exhaust pressure valve 78 that was closed before time t5. Since the flow control valve 80 is closed, the flow of the oxygen-containing gas in the oxygen-containing gas bypass channel 66 is cut off, so that the oxygen-containing gas supplied from the compressor 70 all flows toward the fuel cell stack 12. Accordingly, in the fuel cell stack 12, the water remaining at the MEAs 22 is spattered by the oxygen-containing gas supplied. The oxygen-containing gas supplied is partially discharged into the oxygen-containing gas discharge channel 64 and also partially passes (cross-leaks) through the MEAs 22 to move into the fuel gas flow fields 32 and the fuel gas discharge channel 42 (circulation passage 45). The inside of the fuel cell stack 12 is thus effectively dried by the movement of the oxygen-containing gas.

The cathode scavenging control unit 96 may shift the timing of closing the flow control valve 80 as shown by two-dot chain line in FIG. 4 to a time point after time t5 (time t5*a*). Then, the oxygen-containing gas is discharged into the oxygen-containing gas discharge channel 64 through the oxygen-containing gas bypass channel 66 until time t5*a*, so that the fuel gas discharged in the drain discharge process can be diluted effectively.

On the other hand, in the drain discharge process after time t5, the anode scavenging control unit 98 closes the purge valve 46*a* which has been opened and closed intermittently. Further, at time t5, the anode scavenging control unit 98 opens the drain valve 60*a* of the drain channel 60, while monitoring the liquid water through the water level sensor 56*a* of the gas-liquid separator 56.

Further, at time t5, the anode scavenging control unit 98 lowers the amount (supply pressure) of the fuel gas injected from the injector 48. That is, the anode scavenging control unit 98 sets a third injection amount for the injector 48 from time t5 to time t6 that is lower than the second injection amount for the injector 48 from time t4 to time t5.

The drain channel 60 and the drain valve 60*a* being open can smoothly discharge the water (liquid water) stored in the gas-liquid separator 56. At this time, the operation of the injector 48 appropriately adjusts the fuel gas pressure in the circulation passage 45, so as to promote the discharge of the liquid water from the gas-liquid separator 56, while reducing the flow of the fuel gas flowing out into the drain channel 60. The liquid water and fuel gas flowing out into the drain channel 60 downstream of the drain valve 60*a* flows into the oxygen-containing gas discharge channel 64 through the purge channel 46, and is diluted with the oxygen-containing gas in the oxygen-containing gas discharge channel 64, and then discharged out of the vehicle 11.

The operation of opening the drain valve 60*a* (drain discharge process) is performed while monitoring the liquid water level detected by the water level sensor 56*a*. This operation is ended at time t6 at which a given time has passed after the liquid water level has become substantially zero. When the drain discharge process is thus ended (time t6), the anode scavenging control unit 98 lowers the target value of the fuel gas pressure to the pressure value that was set before the freezing preventing process was started. Then, the anode scavenging control unit 98 closes the supply valve 47*a* and the pressure reducing valve 47*b* and stops the operation of the injector 48, which gradually lowers the fuel gas pressure (actual pressure value) in the circulation passage 45. Further, at time t6, the anode scavenging control unit 98 closes the drain valve 60*a* that has been opened. That is, the scavenging operation on the fuel-gas-related devices 14 side ends at this timing.

On the other hand, at time t6, the cathode scavenging control unit 96 continues the cathode scavenging process. That is, the process to sufficiently dry the power generation cells 20 in the fuel cell stack 12 with the oxygen-containing gas takes a longer time than the drain discharge process, and is therefore continued even after the drain discharge process has ended. Preferably, the time of execution of the cathode scavenging process is appropriately set on the basis of the temperature in the surrounding environment. If the temperature of the fuel cell stack 12 is high, for example, the cathode scavenging process may be performed for a shorter time period than the purge valve scavenging process.

After time t6, the cathode scavenging control unit 96 continuously rotates the compressor 70 at the third required rotational speed, while keeping the flow control valve 80 in the closed state and the exhaust pressure valve 78 in the open state. The inside of the fuel cell stack 12 is thus dried sufficiently, preventing the power generation cells 20 from freezing even if the environment temperature becomes low after the freezing preventing process.

Then, at time t7 after a certain time has passed from the beginning (time t5) of the cathode scavenging process, the cathode scavenging control unit 96 ends the cathode scavenging process (step S3-3 in FIG. 3B). At this time, the cathode scavenging control unit 96 sets the required rotational speed of the compressor 70 to zero to stop the rotation of the compressor 70. The cathode scavenging control unit 96 keeps the exhaust pressure valve 78 in the open state and the flow control valve 80 in the closed state. The fuel cell system 10 thus terminates the freezing preventing process and moves to a standby state.

After the fuel cell system 10 has performed the freezing preventing process as described above, almost no water is present in the circulation passage 45, even if the temperature in the surrounding environment becomes low. The fuel cell system 10 can thus prevent the freezing of the purge valve 46a to thereby solve the problem that the fluid cannot be discharged from the circulation passage 45 if the purge valve 46a freezes. Furthermore, in the fuel cell system 10, the purge valve 46a does not need to be provided with a heater or the like, which avoids increase in the manufacturing costs and increase in power consumption.

The present invention is not limited to the embodiments described above and various modifications are possible according to the essence and gist of the invention. For example, the fuel cell system 10 may perform the cathode scavenging process during the execution of the purge valve scavenging process in which the purge valve 46a is opened and closed intermittently. Further, the fuel cell system 10 may perform the purge valve scavenging process without performing the cathode scavenging process and the oxygen-containing-gas passage diluting process. Alternatively, the timing of execution of the oxygen-containing-gas passage diluting process may be set to a time point at which the purge valve scavenging process is executed or a time point after the purge valve scavenging process.

Technical ideas and effects that can be grasped from the embodiments above will be recited below.

An aspect of the present invention provides a method of operating a fuel cell system 10 including a fuel cell stack 12, a fuel gas supply channel 40 for supplying a fuel gas into the fuel cell stack 12, a circulation passage 45 for circulating a fuel off-gas discharged from the fuel cell stack 12 back into the fuel cell stack 12, a purge valve 46a for discharging the fuel off-gas from the circulation passage 45, and a temperature sensor 84 for detecting a temperature in a surrounding environment around the purge valve 46a. The method includes a judging step of determining whether or not the temperature detected by the temperature sensor 84 is at or below a given temperature (freezing judging threshold Th); and a purge valve scavenging process step of, if the temperature is at or below the given temperature, intermittently opening and closing the purge valve 46a multiple times, while supplying the fuel gas through the fuel gas supply channel 40.

The method of operating the fuel cell system 10 including the judging step and the purge valve scavenging process step can effectively discharge water in the vicinity of the purge valve 46a in a low-temperature environment where the purge valve 46a may freeze. In particular, in the purge valve scavenging process step, by intermittently opening and closing the purge valve 46a multiple times to pulsate the fuel gas pressure upstream of the purge valve 46a, the water contained in the circulating passage 45 and the purge channel 46 can be moved and discharged from the purge valve 46a smoothly. The fuel cell system 10 can thus prevent the freezing of the purge valve 46a more reliably.

The fuel cell system 10 further includes: an oxygen-containing gas supply channel 62 for supplying an oxygen-containing gas into the fuel cell stack 12; an oxygen-containing gas discharge channel 64 through which an oxygen-containing off-gas discharged from the fuel cell stack 12 flows, the oxygen-containing gas discharge channel 64 being connected to a purge channel 46 through which a fluid discharged from the purge valve 46a flows; an oxygen-containing gas bypass channel 66 connecting the oxygen-containing gas supply channel 62 and the oxygen-containing gas discharge channel 64, the oxygen-containing gas bypass channel 66 conveying the oxygen-containing gas in the oxygen-containing gas supply channel 62 directly into the oxygen-containing gas discharge channel 64; and an exhaust pressure valve 78 provided on the oxygen-containing gas discharge channel 64 in a position between the fuel cell stack 12 and a connection with the oxygen-containing gas bypass channel 66, the exhaust pressure valve 78 opening and closing the oxygen-containing gas discharge channel 64. In the purge valve scavenging process step, the method closes the exhaust pressure valve 78 and conveys the oxygen-containing gas into the oxygen-containing gas discharge channel 64 through the oxygen-containing gas bypass channel 66, to thereby dilute the fuel gas discharged from the purge valve 46a. In this way, the fuel cell system 10 can effectively dilute the fuel gas that is discharged when the purge valve 46a is opened, with the oxygen-containing gas in the oxygen-containing gas discharge channel 64. Furthermore, the fuel cell system 10 can increase the internal pressure of the fuel cell stack 12 by closing the exhaust pressure valve 78 in the purge valve scavenging process step.

A compressor 70 for supplying the oxygen-containing gas into the fuel cell stack 12 is provided on the oxygen-containing gas supply channel 62. After the purge valve scavenging process step, the method performs a cathode scavenging process step of opening the exhaust pressure valve 78 while rotating the compressor 70 to supply the oxygen-containing gas into the fuel cell stack 12 through the oxygen-containing gas supply channel 62, to thereby reduce the water content in the fuel cell stack 12. In this way, the fuel cell system 10 can perform the purge valve scavenging process step and the cathode scavenging process step together, thereby reducing the power consumption of the battery Bt due to the execution of the purge valve scavenging process step to improve fuel efficiency.

Further, the rotational speed of the compressor 70 in the purge valve scavenging process step is higher than the rotational speed of the compressor 70 in the cathode scavenging process step. In this way, by changing the flow rate of the oxygen-containing gas from the compressor 70 from a higher flow rate to a lower flow rate, the fuel cell system 10 can reduce noise in the freezing preventing process and enhance marketability.

Further, before the purge valve scavenging process step, the method performs an oxygen-containing-gas passage diluting process step of rotating the compressor 70 to convey the oxygen-containing gas into the oxygen-containing gas discharge channel 64. In this way, by filling the oxygen-containing gas discharge channel 64 with the oxygen-containing gas before the execution of the purge valve scavenging process step, the fuel cell system 10 can reliably dilute the fuel gas in the purge valve scavenging process step.

A flow control valve 80 for adjusting the flow rate in the oxygen-containing gas bypass channel 66 is provided on the oxygen-containing gas bypass channel 66, the flow control valve 80 is opened in the purge valve scavenging process step, and the flow control valve 80 is closed in the cathode scavenging process step. In this way, the fuel cell system 10 can guide the oxygen-containing gas smoothly into the oxygen-containing gas discharge channel 64 in the purge valve scavenging process step, and guide the oxygen-containing gas smoothly into the fuel cell stack 12 in the cathode scavenging process step.

Further, a gas-liquid separator 56 for separating liquid and gas contained in the fuel off-gas discharged from the fuel cell stack 12 is provided on the circulation passage 45. A drain channel 60 for discharging the separated liquid is connected to the gas-liquid separator 56, the drain channel 60 including a drain valve 60*a* for opening and closing the drain channel 60. The drain valve 60*a* is closed in the purge valve scavenging process step, and, after the purge valve scavenging process step, the method performs a drain discharge process step of opening the drain valve 60*a* to discharge the liquid. In this way, the fuel cell system 10 can effectively discharge the liquid also from the gas-liquid separator 56.

Further, in the drain discharge process step, the pressure of the fuel gas in the circulation passage 45 is set to be lower than the pressure of the fuel gas in the circulation passage 45 in the purge valve scavenging process step. In this way, the fuel cell system 10 can reduce the discharge of the fuel gas in the drain discharge process step to improve the efficiency of the fuel gas.

Further, the fuel cell system 10 is mounted in a vehicle 11, and the method performs the judging step and the purge valve scavenging process step in a state where the operation of the vehicle 11 is stopped. In this way, the fuel cell system 10 can prevent the freezing of the purge valve 46*a* when the temperature in the environment becomes low while the vehicle 11 is not operating.

What is claimed is:

1. A method of operating a fuel cell system including
  a fuel cell stack,
  a fuel gas supply channel configured to supply a fuel gas into the fuel cell stack,
  a circulation passage configured to circulate a fuel off-gas discharged from the fuel cell stack back into the fuel cell stack,
  a purge valve configured to discharge the fuel off-gas from the circulation passage, and
  a temperature sensor configured to detect a temperature in a surrounding environment around the purge valve,
  the method comprising:
  determining whether or not the temperature detected by the temperature sensor is at or below a given temperature; and
  if the temperature is at or below the given temperature, performing a purge valve scavenging process of intermittently opening and closing the purge valve multiple times, while supplying the fuel gas through the fuel gas supply channel.

2. The method of operating the fuel cell system according to claim 1, wherein
  the fuel cell system further includes
  an oxygen-containing gas supply channel configured to supply an oxygen-containing gas into the fuel cell stack,
  an oxygen-containing gas discharge channel through which an oxygen-containing off-gas discharged from the fuel cell stack flows, the oxygen-containing gas discharge channel being connected to a purge channel through which a fluid discharged from the purge valve flows,
  an oxygen-containing gas bypass channel configured to connect the oxygen-containing gas supply channel and the oxygen-containing gas discharge channel, and convey the oxygen-containing gas in the oxygen-containing gas supply channel directly into the oxygen-containing gas discharge channel, and
  an exhaust pressure valve provided on the oxygen-containing gas discharge channel in a position between the fuel cell stack and a connection with the oxygen-containing gas bypass channel, the exhaust pressure valve being configured to open and close the oxygen-containing gas discharge channel, and
  wherein, in the purge valve scavenging process, the method closes the exhaust pressure valve and conveys the oxygen-containing gas into the oxygen-containing gas discharge channel through the oxygen-containing gas bypass channel, to thereby dilute the fuel gas discharged from the purge valve.

3. The method of operating the fuel cell system according to claim 2, wherein
  a compressor configured to supply the oxygen-containing gas into the fuel cell stack is provided on the oxygen-containing gas supply channel, and
  after the purge valve scavenging process, the method performs a cathode scavenging process of opening the exhaust pressure valve while rotating the compressor to supply the oxygen-containing gas into the fuel cell stack through the oxygen-containing gas supply channel, to thereby reduce a water content in the fuel cell stack.

4. The method of operating the fuel cell system according to claim 3, wherein a rotational speed of the compressor in the purge valve scavenging process is higher than a rotational speed of the compressor in the cathode scavenging process.

5. The method of operating the fuel cell system according to claim 3, wherein, before the purge valve scavenging process, the method performs an oxygen-containing-gas passage diluting process of rotating the compressor to convey the oxygen-containing gas into the oxygen-containing gas discharge channel.

6. The method of operating the fuel cell system according to claim 3, wherein
  a flow control valve configured to adjust a flow rate in the oxygen-containing gas bypass channel is provided on the oxygen-containing gas bypass channel,
  the flow control valve is opened in the purge valve scavenging process, and
  the flow control valve is closed in the cathode scavenging process.

7. The method of operating the fuel cell system according to claim 1, wherein
  a gas-liquid separator configured to separate liquid and gas contained in the fuel off-gas discharged from the fuel cell stack is provided on the circulation passage,
  a drain channel configured to discharge the separated liquid is connected to the gas-liquid separator, the drain channel including a drain valve configured to open and close the drain channel,
  the drain valve is closed in the purge valve scavenging process, and
  after the purge valve scavenging process, the method performs a drain discharge process of opening the drain valve to discharge the liquid.

8. The method of operating the fuel cell system according to claim 7, wherein, in the drain discharge process, a pressure of the fuel gas in the circulation passage is set to be lower than a pressure of the fuel gas in the circulation passage in the purge valve scavenging process.

9. The method of operating the fuel cell system according to claim 1, wherein the fuel cell system is mounted in a vehicle, and the method determines whether or not the temperature is at or below the given temperature and performs the purge valve scavenging process in a state where operation of the vehicle is stopped.

\* \* \* \* \*